US006486700B1

(12) United States Patent
Fairbanks et al.

(10) Patent No.: US 6,486,700 B1
(45) Date of Patent: Nov. 26, 2002

(54) ONE-HOT MULLER C-ELEMENTS AND CIRCUITS USING ONE-HOT MULLER C-ELEMENTS

(75) Inventors: Scott M. Fairbanks, Mountain View; Charles E. Molnar, deceased, late of Sunnyvale, both of CA (US), by Donna A. Molnar, executrix

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/938,353

(22) Filed: Aug. 23, 2001

(51) Int. Cl.$^7$ ............................................... H03K 19/23
(52) U.S. Cl. .............................. 326/36; 326/35; 326/83
(58) Field of Search .............................. 326/11, 35, 36, 326/52, 55, 83, 56, 57, 58; 327/215

(56) References Cited

U.S. PATENT DOCUMENTS 5,737,614 A * 4/1998 Durham et al. ........ 395/750.04

OTHER PUBLICATIONS

Lu, "Improved design of CMOS multiple-input Muller-C-elements", Sep. 1993, Electronics Letters, vol. 29, No. 19, pp. 1680–1682.*

Santos et al.,"A CMOS Delay Locked Loop and Sub-Nanosecond Time-to-Digital Converter Chip", Jun. 1996, IEEE Transactions on Nuclear Science, vol. 43, No. 3, pp. 1717–1719.*

* cited by examiner

Primary Examiner—Daniel D. Chang
(74) Attorney, Agent, or Firm—Philip H. Albert; Townsend and Townsend and Crew

(57) ABSTRACT

A one-hot Muller C-element, wherein an event received on each of a plurality of inputs results in an event being output, can be implemented with complementary inputs and a true transistor pair comprising one transistor having a gate coupled to a first true input and another transistor having a gate coupled to a second true input; a true arm comprising the true transistor pair, coupled in series between a complement output and ground, and a true pull-up transistor, coupled between the complement output and a source; a true arm pull-up logic gate, coupled at its inputs to complement input wires of the one-hot Muller C-element and coupled at its output to a gate of the true pull-up transistor; a complement transistor pair comprising one transistor having a gate coupled to a first complement input and another transistor having a gate coupled to a second complement input; a complement arm comprising the complement transistor pair, coupled in series between a true output and ground, and a complement pull-up transistor, coupled between the true output and the source; and a complement arm pull-up logic gate, coupled at its inputs to true input wires of the one-hot Muller C-element and coupled at its output to a gate of the complement pull-up transistor.

7 Claims, 6 Drawing Sheets

US 6,486,700 B1

ONE-HOT MULLER C-ELEMENTS AND CIRCUITS USING ONE-HOT MULLER C-ELEMENTS

FIELD OF THE INVENTION

This invention relates to logic circuits and in particular to an improved Muller C-element.

BACKGROUND OF THE INVENTION

Muller C-elements are common in asynchronous systems. See, for example, Sutherland, "Micropipelines," *Communications of the ACM,* June 1989, which describes some operations and uses of Muller-C elements. A Muller C-element is often included in completion detectors for asynchronous systems and in asynchronous pipelines. In many circuits and systems, the overall speed of the circuit or system is dependent on the speed of the Muller C-elements that are part of the circuit or system. Because such circuits and systems are often designed for high-speed control systems, improving the speed of the Muller C-elements will often greatly improve the utility of the circuit or system. High speed control systems make possible high performance processors, communication buffers and so forth. For example, some asynchronous control systems might operate with as few as four gate delays per data element, whereas today's high performance synchronous systems typically operate no faster than ten or twelve gate delays per data element, to leave time for data processing steps.

In the simplest form of a Muller C-element, its output signals an event when an event is received at all of its inputs. In a specific Muller C-element, for example, events might be represented as transitions from a logical LO to a logical HI. Logical LO and HI might refer to a lower voltage and a higher voltage, respectively, but might instead be vice versa.

The speed of a Muller C-elements is limited by the number of gates that a transition must pass through, so that is a consideration in designing a Muller C-element. Another consideration is whether the element will draw large currents ("crossover currents") between the rails, as that makes the circuit inefficient and crossover currents introduce delay. It is therefore desirable to have a Muller C-element with faster responses to events and that waste less energy.

U.S. Pat. No. 5,638,009 issued to Sutherland et al. (hereinafter "the Sutherland patent") shows the use of three-wire encoding referred to as "screw logic", but in some applications other than three-wire encoding is preferred. U.S. Pat. No. 6,281,707 (U.S. application Ser. No. 09/401, 747, filed Sep. 23, 1999 and entitled "Two-stage Muller C-Element") describes a two-input Muller C-element.

SUMMARY OF THE INVENTION

This invention provides an improved Muller C-element. In one aspect of the invention, a Muller C-element is a "one-hot" Muller C-element that uses 1-2 fork where the one-stage branch of the fork is associated with the transition that carries event information. In a specific embodiment, the branch that carries event information uses N-type transistors to effect the transition.

In another aspect of the invention, control circuits comprising strings of one-hot Muller C-elements are used to provide asynchronous control.

DESCRIPTION OF THE SPECIFIC EMBODIMENTS

In the figures, like elements are labeled with like numbers and different instances of like elements are labeled with like numbers and different parenthetical numbers or letters.

Basic Muller C-Element (MCE)

Figure 1:
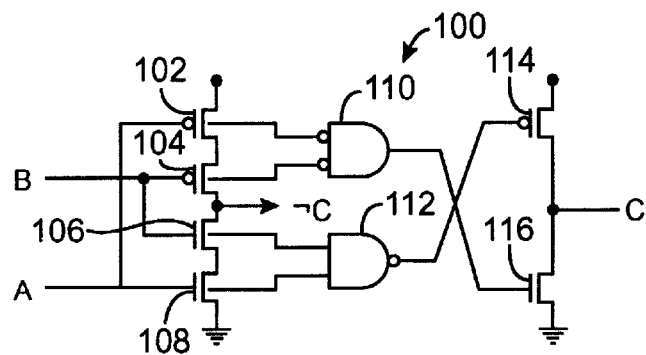
FIG. 1 is a schematic diagram of a 1-2 forked Muller C-element.

FIG. 1 shows a basic circuit 100 implementing an MCE. Circuit 100 can be thought of as having a forked arrangement, with one arm of the fork for each rail of the output (C and ¬C). The arm of the fork associated with the C output is referred to herein as the "true" arm, while the arm of the fork associated with the ¬C output is referred to herein as the "complement" arm. In FIG. 1, the complement arm comprises P-type transistors 102, 104 and N-type transistors 106, 108, while the true arm comprises a NOR gate 110, a NAND gate 112, a P-type transistor 114 and an N-type transistor 116.

The inputs to circuit 100 are single rail inputs, labelled A and B. The operation of the MCE is such that when an event arrives at each of the inputs, the MCE outputs an event. In the case of circuit 100, events at the input are signalled with a rising edge of the single rail input and an event is output as a rising edge on the true wire and a falling edge on the complement wire.

By convention, the states of the wires comprising an input or output are designated "hot" and "cold". Where "hot" is associated with a logical HI and "cold" is associated with a logical LO, the states are "active-HI" states and where "hot" is associated with a logical LO and "cold" is associated with a logical HI, the states are "active-LO". Typically, a logical HI refers to a higher voltage than a logical LO, but that need not be the case.

Where an input or output comprises multiple wires, an event is signalled using a predefined set of hot and cold conditions on the wires. For example, three-wire, one-hot logic uses three wires to carry a signal and an event is signalled by the transition from a state of all three wires being LO to a state where one of the wires is HI. Thus, in a one-hot MCE, events arrive at an input to the MCE when one of the wires of the input goes HI.

Circuit 100 is referred to as a 1-2 MCE, as the number of gate delays from the inputs to the complement output is 1 and the number of gate delays from the inputs to the true output is 2. This is clearer in FIG. 2, which shows the individual transistors that make up NOR gate 110 and NAND gate 112. As shown there, the A input connects to the C output through the transistor pair 202, 206 (one delay) and transistor 116 (a second delay). Likewise, the B input connects to the C output through transistor pair 204, 208 and transistor 114.

A "keeper" (not shown in the figures) cross connects the two sides of the fork, to retain the output value when the inputs differ and to reduce the time skew between the transitions on the two outputs of the fork. With a keeper, the output of the one-hot MCE will go HI when all of its inputs go HI and the output will remain HI even as one or more of the inputs go LO, until all of the inputs go LO, at which point the output of the MCE goes LO.

Figure 2:
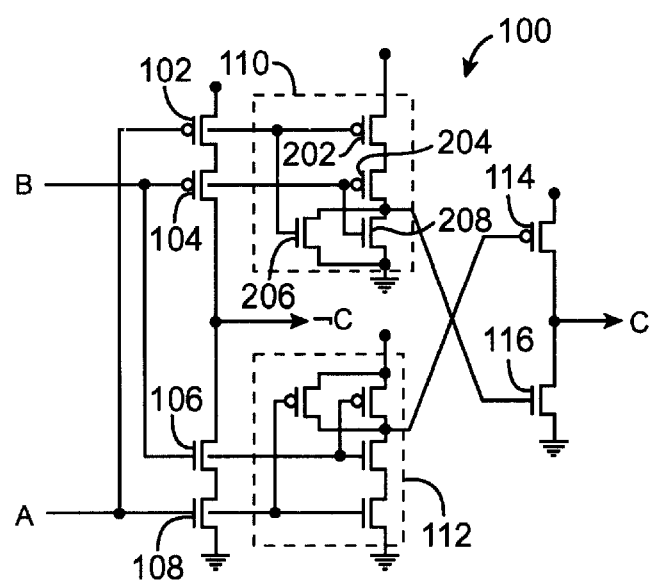
FIG. 2 is a schematic diagram of the 1-2 forked Muller C-element of FIG. 1, making explicit the transistors of the logic gates depicted in FIG. 1.
Figure 3:
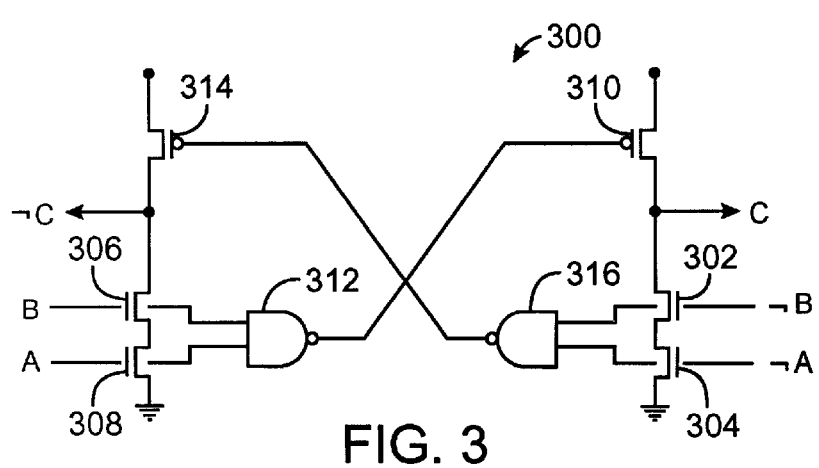
FIG. 3 is a schematic diagram of a one-hot 1-2 forked Muller C-element according to one aspect of the invention.

While FIGS. 1–2 show. an MCE that have single wire inputs, FIG. 3 shows a circuit 300 that is a one-hot MCE with two-wire inputs. Circuit 300 differs from circuit 100, among other differences, in that each output (C, ¬C) rail is driven low by N-type transistors in series and high by P-type transistors and a NAND gate. As with circuit 100 in FIGS. 1–2, the keeper is not shown.

In circuit 300, a one-stage circuit (transistors 302, 304 in the case of the C arm and transistors 306, 308 in the case of the ¬C arm) conditions the LO-going output rail while a two-stage circuit (transistor 310 and NAND gate 312 or transistor 314 and NAND gate 316) conditions the HI-going output rail. Because the major work is done by N-type transistors, however, true and complement inputs are used. While complementary inputs might require more circuitry to provide the inputs, the complementary inputs have the advantage of reducing the logical effort required, because all of the logic is done by N-type transistors. N-type transistors have higher mobility of charge carriers, so they can conduct more electric current per unit of charge.

When the complementary inputs are not exactly complementary, either the rising or falling transition will occur slightly before the other and both the true and complementary rails of the input will momentarily have the same value, either HI or LO, as the case might be. If both true and complement rails of both the A input and the B input are all HI (i.e., everything is "hot"), circuit 300 will attempt to drive both its outputs both HI and LO, consuming much power. If both rails or both inputs are LO ("cold"), then circuit 300 merely retains its present output values, as only the keeper would be driving the output. While both rails of a dual-rail input may be LO at the same time, there is little harm relative to. having both rails HI and so the preferred system using such a circuit would have the LO-going "hot to cold" transition on one rail precede the HI-going "cold to hot" transition on the other rail.

When events are encoded with one-hot encoding where "hot" is HI, the rising transition on one of two wires carries the event information. The falling transition on this wire is meaningless and may happen when desired, preferably before the other wire goes HI. The rise and fall events in one-hot encoding are unlike those in the dual-rail encoding previously used. The usual dual-rail encoding seeks to keep rise and fall events concurrent using keepers and delay matching so that there are only two stable states (i.e., the two wires are nearly always complementary). In contrast, one-hot encoding has three potentially stable states, two states where one of the wires is hot and the other is cold, and one state where both of the wires are cold. The one-hot encoding prefers the "hot to cold" transition to precede the "cold to hot" transition, so that excessive power is not expended in while switching. Because one of the transitions is less critical than the other, less charge can be devoted to the less critical transition and more charge devoted to making the critical transition happen quickly.

For the 1-2 forked Muller C-element of FIG. 3, the "cold to hot" transition is the rising one. In circuit 300, each arm of the fork has a one-stage side that pulls its output down ("hot" to "cold") and a two-stage side that pulls its output up. For example, consider the true arm that controls the C output. On the true arm, the C output is pulled down when the ¬A and ¬B rails go HI and turn on N-type transistors 302 and 304. That side of the transition is a one-stage side, as only one gate delay occurs between input and output. One the other hand, the C output is pulled up when the A and B rails go HI, causing the output of NAND gate 312 to go LO and P-type transistor 310 to turn on, thus forming a two-stage side. Because the falling transition is one-stage and the rising transition is two-stage, the falling transition on one output rail will precede the rising transition on the other rail, setting up the preferred relationship for circuits on the output of circuit 300.

According to the one-hot protocol for a twin pair of signals, X and ¬X, the signals should act almost as a complementary pair, where a rising transition of one signal always matches a falling transition of the other signal. Although the two transitions are nominally concurrent, one inevitably precedes the other by a short time.

The "one-hot active-HI" protocol permits X and ¬X to both to be LO at the same time, but precludes both from being HI at once. Thus, in the one-hot active-HI protocol, the falling transition of one signal should precede the rising transition of the other. For the "one-hot active-HI" protocol, the rising transition serves as the active edge while the falling transition serves as the inactive edge or the "reset edge." The active edge carries the timing information; the reset edge, which precedes the active edge slightly, can be used to help the receiving circuit prepare for arrival of the active edge. Of course, with asynchronous circuits such as those described herein, the circuits should be relatively insensitive to delays and the reset edge can precede the active edge by a varying time without ill effects. As will be described, circuits described herein can take advantage of the intervals between receipt of the reset edge and receipt of the active edge.

The "one-hot active-LO" protocol is the reverse of the active-HI protocol. The one-hot active-LO protocol permits X and ¬X both to be HI at the same time, but precludes both from being LO at the same time. For that protocol, the falling transition is the active edge and the rising transition is the inactive edge or reset edge. Table 1 summarizes the protocols and how events are signaled in the protocols.

TABLE 1

| Event | One-Hot Active-HI | One-Hot Active-LO |
|---|---|---|
| Active level | HI | LO |
| Inactive level | LO | HI |
| Active edge | rising edge | falling edge |
| Inactive or reset edge | falling edge | rising edge |
| Allowed states | LO/LO, LO/HI, HI/LO | LO/HI, HI/LO, HI/HI |
| Precluded states | HI/HI | LO/LO |
| Transition desired first | falling edge | rising edge |

Figure 4:
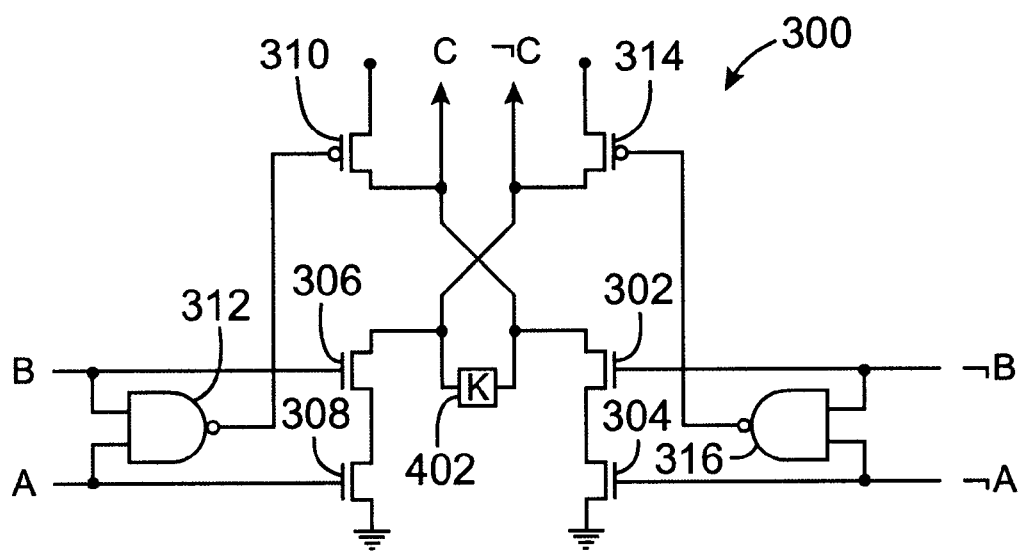
FIG. 4 is a schematic diagram of the one-hot 1-2 forked Muller C-element shown in FIG. 3, with the circuit elements rearranged to more clearly delineate the separate forks of the C-element.

In FIG. 4, circuit 300 is shown with a keeper 402 and is arranged so that the elements that act on the true wire(s) of the inputs are to the left of the keeper and the elements that act on the complement wire(s) of the inputs are to the right of the keeper.

Keeper 402 retains the value of C and ¬C when the driver transistors are all off. One form of keeper is a pair of weak inverters connected back to back. Another form of keeper is a pair of weak NAND gates connected back to back. The extra inputs of these NAND gates can provide a preset during a master clear. The design of the keeper should be such that the large driver transistors can easily overpower either form of keeper when the drivers are turned on to drive the output. The keeper provides the single bit of storage required by the Muller C-element logic.

A typical keeper implementation is two back-to-back inverters, typically connected across the two outputs. Some keepers include an input to force the keeper into one of its two possible states, as might be used during a master clear. The keeper resists changes in the output when the inputs do not match, but also resists valid changes when the inputs match. While resistance to change is often an undesirable property, it can be minimized by using transistors in the keeper that are smaller relative to the transistors that would be forcing a valid change.

FIG. 4 will now be used to illustrate an operation of a one-hot 1-2 Muller C-element. The "1-2" refers to the fact that circuit 300 has a 1-2 fork structure. The transistors shown in FIG. 4 are large drivers capable of producing major currents in the C and ¬C outputs. These are referred to herein as the N-type driver logic (elements 302, 304, 306, 308) and the P-type pullup drivers (310, 314), or collectively as the driver transistors.

Circuit 300 uses the "one-hot active-HI" protocol with complementary input signal pairs, [A, ¬A] and [B, ¬B]. Circuit 300 uses the same protocol for its output pair [C, ¬C]. The circuit is active-HI because the AND function between its inputs becomes TRUE for HI inputs. Active-Hi protocols are preferred in some cases, because N-type transistors establish the protocol used by the circuit.

There are two forks, one starting at A and B (the "true" fork), the other starting at ¬A and ¬B (the "complement" fork). In FIG. 4, the true fork comprises elements 310, 306, 308, 312 to the left of keeper 402 and the complement fork comprises elements 314, 302, 304, 316 to the right of keeper 402. Each fork has two arms, one arm having a single inversion and the other arm having two inversions, hence the name 1-2 fork. Usually forks are made with simple inverters, but in this case, each arm performs an AND logic function.

In preferred embodiments, with the one-hot active-HI protocol, the A, B inputs driving the ¬C output LO creates a more critical edge than the A, B inputs driving the C output HI. One reason for this is that crossover currents are avoided in a subsequent circuit by having ¬C fall before C rises. The same is true for the opposite inputs and output. More simply, that critical edge is the active edge, whereas the other edge is the inactive, or reset, edge. Therefore, it is normally preferable to size components such that when the current from an input splits into current controlling the active edge and current controlling the inactive edge, more current should go to controlling the active edge.

In the case of circuit 300 in FIG. 3, that would mean that more current from input A would go to turning on transistor 308 to pull down the ¬C output than would go to switching NAND gate 312 to turn on transistor 310 and pull up the C output. Similar considerations would also apply to the B, ¬A and ¬B inputs.

In FIG. 4, for example, the true fork comprises a single-stage or "1" arm that starts with the inputs A, B and ends at output ¬C. The one "stage" is the pair of N-type series transistors 306, 308. When A and B are both HI, the pair of N-type series transistors 306, 308 drives ¬C towards LO, which is a single inversion.

The two-stage or "2" arm of the true 1-2 fork starts at inputs A, B and ends at output C. The two stages are NAND gate 312 and P-type driver transistor 310. When A and B are both HI, the output of NAND gate 312 goes LO, which conditions P-type driver transistor 310 to drive C towards HI. NAND gate 312 is the first stage in the two-stage arm of the true 1-2 fork and P-type driver transistor 310 is the second stage.

As arranged, both arms of the fork only act when their respective inputs are both active. Thus, the true fork (on the left of FIG. 4) acts only when inputs A and B are both HI and the complement fork (on the right of FIG. 4) acts only when ¬A and ¬B are both HI. A crossover from left to right is necessary in FIG. 4, because the each fork drives both C and ¬C.

If A and B differ, ¬A and ¬B must also differ, according to the "one-hot active-HI" protocol. When they differ, neither fork drives C or ¬C and the keeper retains the previous value on the outputs as is required of Muller C-elements. Moreover, in this condition, the NAND gates 312, 316 will both condition their outputs HI, turning off the P-type transistors 310, 314. Thus, if A and B differ, the driver transistors will be off. The possible case of both inputs being LO is described later below.

When the inputs again take on matching values, the AND logic in one fork or the other will be satisfied, and that fork will begin to drive the outputs. Because all drivers are off just before the fork begins to drive the outputs, there will be little or no crossover current in the output drivers as the chosen fork begins to drive one output HI and the other LO. The keeper fights the transition, of course, but it is small compared to the output drivers and its crossover current consumes little power.

Consider what happens if inputs A and ¬A are both LO during a transition on the A pair, as might happen according to the one-hot active-HI protocol. Suppose the reset transition has arrived on ¬A, driving it LO and the circuit awaits the active edge on A that will drive it HI. Suppose further that an event has already arrived at B (so B is HI). While A and ¬A are both LO, both forks turn off and the circuit avoids driving its output. The keeper retains the output value as previously established.

When the active edge arrives at input A, N-type transistor 308 turns on and since transistor 306 is already on, the pair conducts and starts to drive ¬C towards LO. Shortly thereafter, the NAND gate 312 output falls, turning on P-type transistor 310 to drive C towards HI. The falling transition on ¬C precedes the rising transition on C because the N-type transistor pair 306, 308 acts before NAND gate 312 and transistor 310, as it should according to the one-hot active-HI protocol. Thus, if the inputs to circuit 300 obey the protocol, so will its output.

If the inputs to circuit 300 fail to follow the protocol, it might happen that all inputs would be HI at the same time. In that case, circuit 300 would suffer crossover currents flowing through the P-type driver transistors and the N-type driver transistors. The output voltage would assume some value intermediate between LO and HI. By suitable choice of transistor sizes, this intermediate value can be made sufficiently near LO that adjacent circuits will interpret it as both inputs being LO, which is permitted by the protocol. Thus, suitable transistor sizes can keep minor violations of the protocol from propagating to adjacent circuits.

Figure 5:
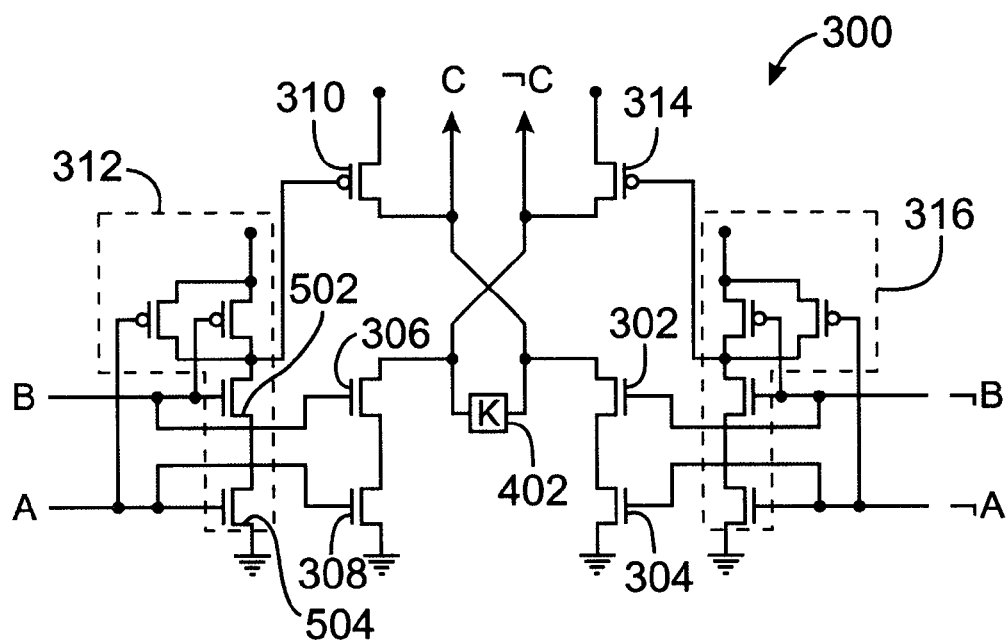
FIG. 5 is a schematic diagram of the one-hot 1-2 forked Muller C-element of FIG. 4, making explicit the transistors of the logic gates depicted in FIG. 4.

FIG. 5 shows the same circuit 300 with the NAND gates 312, 316 expanded into individual transistors. As shown, NAND gate 312 contains two series N-type transistors (502, 504) connected in parallel with the two N-type series transistors 306, 308. NAND gate 316 is similarly arranged. The pairs of series transistors (i.e., 306/308 and 502/504) perform the same logic function in both arms of each fork, because their inputs are connected in parallel.

Speed Improvement Techniques

The high speed of the elements described here makes possible a host of high speed asynchronous FIFO buffers and pipeline controls that will exhibit low latency as well as high throughput. The high speed of these circuits provides sufficient leeway to retard their operation flexibly to accommodate data processing when required.

One technique to achieve speed in these circuits is to avoid the use of P-type transistors whenever possible, using N-type instead. N-type transistors result in faster circuits because the higher mobility of the charge carriers in N-type transistors allows them to conduct more electric current per unit of charge. In avoiding P-type transistors, these circuits are like "domino logic" circuits, which also obtain speed by using N-type transistors rather than P-type transistors to implement logic functions.

Another technique to improve the speed of these circuits is by avoiding crossover currents. Crossover currents occur when an opposing P-type and N-type transistor both momentarily conduct as one turns on and the other turns off. To avoid crossover currents, the delays in these circuits permit one transistor to turn off before the other turns on. This technique is illustrated by, among others, the circuits of FIGS. 3–5.

Yet another technique to improve the speed of these circuits is by a ping-pong technique, where each circuit comprises two identical parts that operate alternately. Operation of one part resets the other part for its next operation. Thus each part can operate at half the total required speed. Coordination between the two parts permits the action to pause at any time with either of the halves ready to act next. The circuits communicate on wire pairs, a form of "dual-rail' signaling. Critical timing information passes alternately on the two wires, allowing each wire to operate at half the combined rate.

As described in the Sutherland patent, a family of three-part circuits are referred to as "screw logic" because the three parts operate in round-robin sequence giving each component a direction of "rotation." Each part resets the previous one in the sequence, but it turns out that three parts are not required to provide adequate reset time. A more preferred approach is the reset technique described herein, as it permits the "one-hot" circuits described here to operate with only two parts, instead of three. In part, the "fork" type of reset makes this possible.

Yet another technique to improve the speed of these circuits is through careful choice of transistor sizes. Selecting the transistor sizes carefully, the rising output on one of the two signaling wires occurs in a proper sequence relationship to the falling output on the other output, helping receiving circuits prepare for their next action.

2-3 Muller C-Elements

Figure 6:
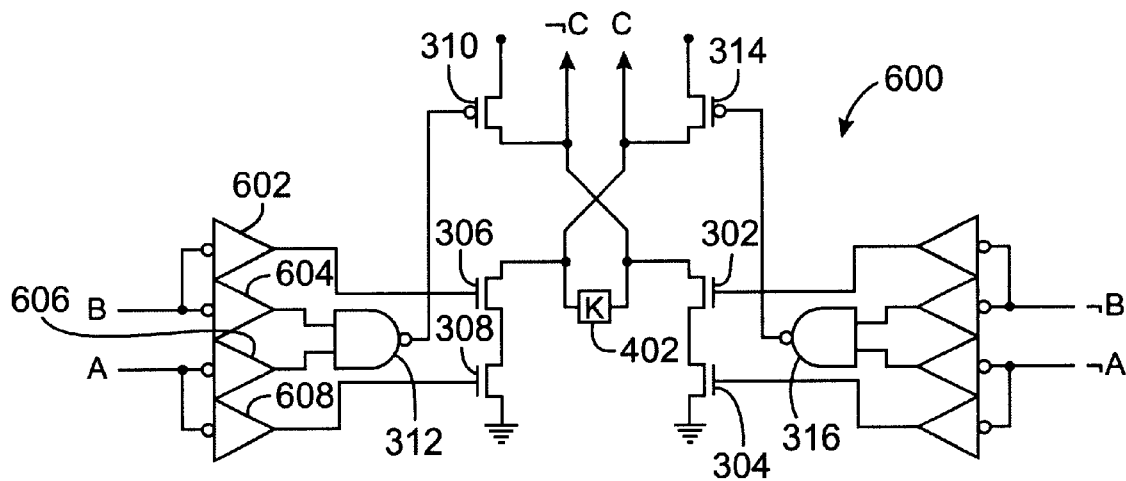
FIG. 6 is a schematic diagram of an AL (amplification before logic) one-hot 2-3 forked Muller C-element.
Figure 7:
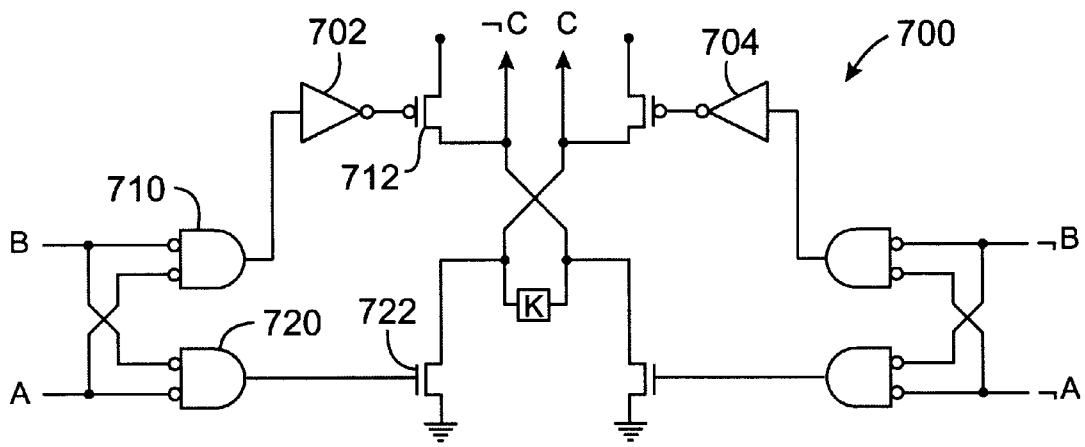
FIG. 7 is a schematic diagram of an LA (logic before amplification) one-hot 2-3 forked Muller C-element.

In some applications, it is useful to add amplification to an MCE. Examples of such MCEs are shown in FIGS. 6–7. Adding amplification to a 1-2 MCE results in a 2-3 MCE. The MCE has a logic function ("AND" in the case of circuit 300) and the amplification can be before the logic or after. FIG. 6 shows a MCE circuit 600 with amplification added before the logic (NAND gates 312, 316). Such a circuit is referred to herein as "type AL" as in "Amplification then Logic." FIG. 7 shows a MCE circuit 700 with amplification added after the logic. Such a circuit is referred to herein as "type LA" as in "Logic then Amplification."

If each MCE in a larger circuit is to use the same protocol and the protocol is such that one kind of transition is the active edge, the number of inversions of an active edge from an input to an output within an MCE should be an even number. In the 1-2 Muller C-element, the active edge undergoes two inversions (the "2" arms of the forks). The active edge undergoes one inversion from the inputs to the opposite outputs, so the inactive edge will typically precede the inactive edge. When amplification is added such that one inverting stage is added to each arm, then the output wires can be switched so that the output protocol remains the same as the input protocol. In the case of adding such amplification to a 1-2 MCE to form a 2-3 MCE, the active edge would be carried on the two-stage arms, because an even number of inversions are needed to keep the input and output protocols the same. The inactive edge would be carried on the three-stage arms 2-3 Muller C-Elements, Type AL FIG. 6 illustrates this concept. As shown there, a circuit 600 is a 2-3 MCE, as some edges travel through two stages and others through three stages. For example, a signal from input A to output ¬C passes through inverter 606, NAND 312 and P-type pullup transistor 310 (three stages) while a signal from input A to output C passes through inverter 608 and transistor 308 (two stages). The extra inverter makes the forking Muller C-element into a 2-3 MCE rather than a 1-2 MCE. Moreover, it inverts the sense of the AND at the input, making the C-element act when both inputs are LO rather than both HI. Thus, a system using such 2-3 C-elements would be active-LO (i.e., LO=hot) rather than active-HI (i.e., HI=hot), so the falling transition becomes the active event, if not for the fact that the output wires are relabelled (compare FIG. 6 and FIG. 4).

In circuit 600, the amplification is provided by eight inverters, one on each input of each arm of each fork. The true fork is shown on the left side of the figure and the complement fork on the right side. The two-stage arm of the true fork starts at inputs A, B and includes inverters 602, 608 as amplifiers and N-type driver transistors 306, 308, ending at output C. When A and B are both LO, the amplifiers and N-type driver transistors make C go LO. The three-stage arm of the true fork also starts at inputs A, B and includes inverters 604, 606 as amplifiers, NAND gate 312 and P-type driver transistor 310 and ends at ¬C. Making A and B both LO makes ¬C go HI through the action of the amplifiers, the NAND gate and the P-type driver transistor.

Amplification in the form of inverters results in the signals being inverted. Unlike the 1-2 Muller C-element, in the 2-3 Muller C-element, the inactive edge passes through more stages (three) than the active edge (two). If the noninverted output is to occur first, the three-stage arms would need to be faster than the two-stage arms. For some tasks, such as where additional logic is provided in place of the inverters (a bifurcator is one example), the Muller C-element is also of a 2-3 fork design, with the extra stage providing the extra logic. While another stage can be added to each side, resulting in a 3-4 fork design, such a circuit might be too much slower than the 2-3 design to gain necessary benefits.

Nonetheless, a suitable 2-3 design can be had, with suitable arrangement and sizing of components, as taught herein. Preferably, for symmetry reasons, regardless of whether the circuit is HI=hot or LO=hot, the active edge should go through an even number of inversions in each Muller C-element. The inactive edge will go through an odd number of inversions in each Muller C-element. It is well to have the inactive edge precede the active edge to reduce power consumption and simplify the internal logic of the Muller C-element.

2-3 Muller C-Elements, Type LA

FIG. 7 is a schematic diagram of a circuit 700 that is an LA type 2-3 MCE. Note that the logic (the NOR gates are an example of logic as might be used) is first, followed by the amplification, provided here by inverters 702, 704. The three-stage arm of the true fork starts at inputs A, B and ends at ¬C and includes NOR gate 710, the inverter 702 (an amplifier) and P-type driver transistor 712. The two-stage arm of the true fork also starts at inputs A, B but ends at C. That arm includes NOR gate 720 and N-type driver transistor 722.

The logic is identical in both arms of the fork because of the parallel inputs to the two NOR gates 710, 720. Since the outputs of the NOR gates are identical, there seems to be no need for two NOR gates in each fork. However, using two has some advantages. One advantage is that it allows for a three-stage arm that is faster than the two-stage arm. One way to achieve such a timing relationship is to use different transistor sizes for the NOR gate in each arm. Thus, NOR gate 710 can be made to be faster than NOR gate 720. NOR gate 710 will be faster if it is not as heavily loaded. Inverter 702 can be made to be fast, by making it strong relative to the load presented to it by P-type driver transistor 712.

Another way to effect the timing difference, alone or in combination with the above techniques, is to skew the two NOR gates 710, 720 and inverter 702. With the one-hot active-LO protocol, the NOR gates respond when both their inputs are LO, so a favorable skew can be had by adjusting transistor sizes for NOR gate 720 (in the two-stage arm) to give it a lower switching threshold than NOR gate 710 (in the three-stage arm). Thus, as the inputs fall, the three-stage arm starts its action first, helping to make the rising output transition precede the falling one. Similarly, as the inputs rise during an inactive or reset transition, the lower switching threshold of NOR gate 720 in the two-stage arm will turn off its N-type driver transistor 722 in time to avoid crossover currents.

Although not explicitly stated, it should be understood that the circuits of FIGS. 6–7 are preferably symmetric between the two forks. However, some applications might benefit from asymmetric forks, and this disclosure should not be construed as being limited to symmetric forks.

A Four-Input LL 2-3 Muller C-Element

Figure 8:
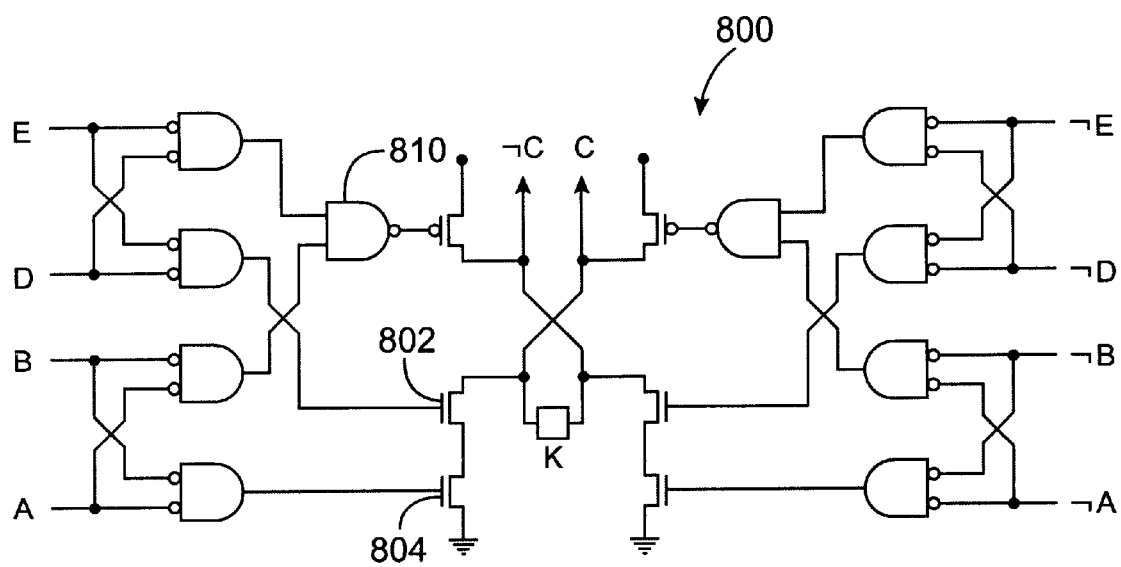
FIG. 8 is a schematic diagram of a one-hot 2-3 Muller C-element with four inputs and separate logic gates for each arm of each fork.
Figure 9:
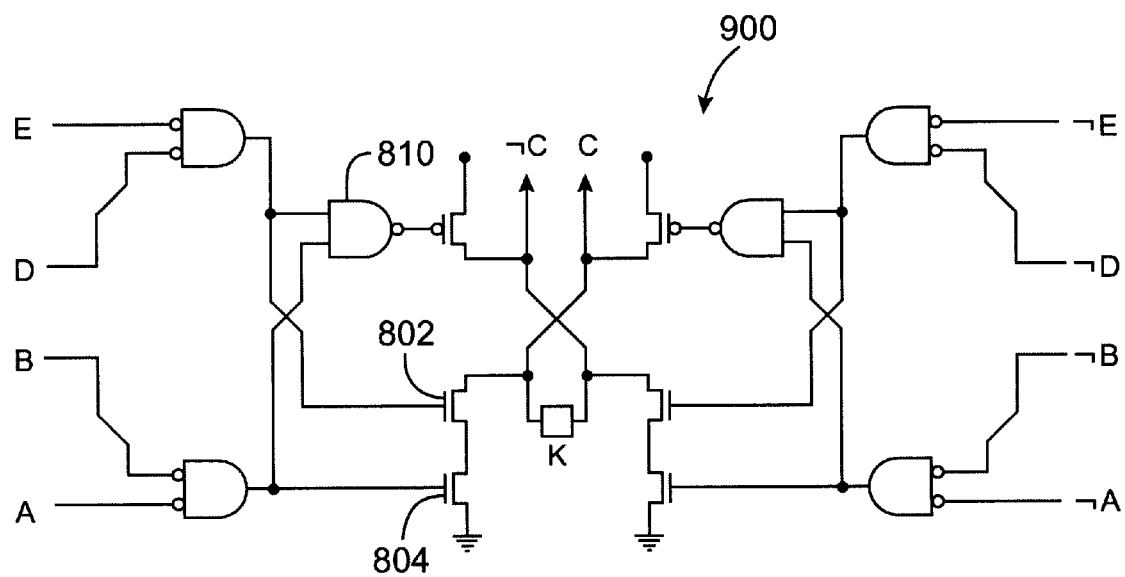
FIG. 9 is a schematic diagram of a one-hot 2-3 Muller C-element with four inputs and combined logic at the inputs of each fork.

FIGS. 8–9 illustrate four-input LL 2-3 Muller C-Elements. As explained above, 2-3 Muller C-elements allow for more logic than 1-2 MCEs, so they are used in spite of their problems. FIG. 8 offers an example of an MCE with additional logic, with a circuit 800 forming a four-input Muller C-element. Circuit 800 uses a pair of series N-type driver transistors 802, 804 instead of the single N-type driver transistor used in circuit 700 (FIG. 7) and inverter 702 with a NAND gate 810.

Rather than combining the four inputs in a single stage, they are combined in pairs in the first stage and those are combined the pairs in the second stage, using N-type transistors in series as the pulldown output driver and the NAND gate to drive the pullup P-type output driver. The third stage of the three-stage arm of a fork is the P-type driver transistor as before. Many control circuits applications can use Muller C-elements like circuit 800, with different kinds of logic in the two logic stages to combine up to six separate inputs.

Circuit 800 can be simplified into a circuit 900 shown in FIG. 9, combining the NOR gates. Circuit 900 is actually a 1-2 fork MCE preceded by NOR gates (compare to FIG. 3). Circuit 900 gains an advantage in simplicity at the cost of greater risk of crossover currents and possible protocol violations. The 1-2 fork, which was just right for the active-HI protocol, is here serving an active-LO protocol with exactly the opposite transition sequence requirements. As indicated above in Table 1, in the active-LO protocol the rising transition should precede the falling one. However, circuit 900 generates the falling transition with fewer stages than the rising transition. Circuit 900 might violate the proper sequence of rising and falling transitions at its output, however this can be ameliorated by proper design of strings of MCEs.

Strings of Muller C-Elements

Figure 10:
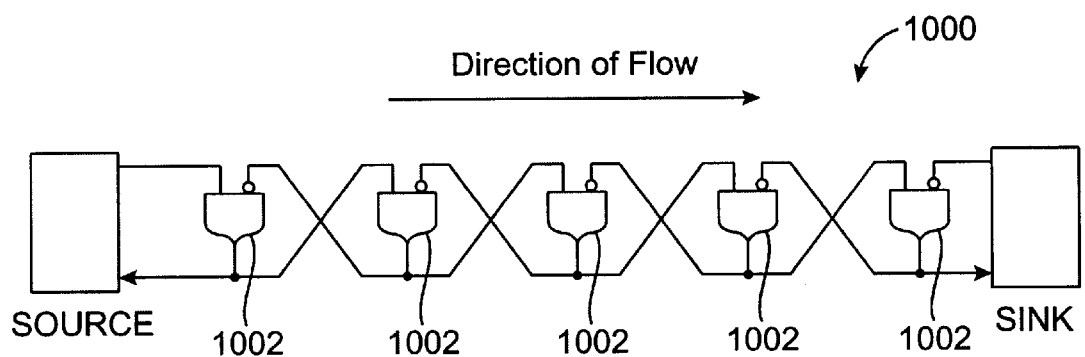
FIG. 10 is a schematic diagram of a micropipeline comprising a plurality of Muller C-elements between a source and a sink, with the lines interconnecting the Muller C-elements representing event signal paths.
Figure 11:
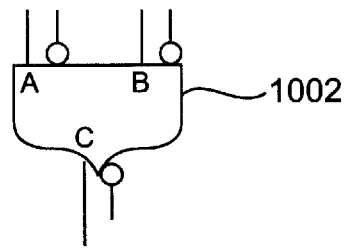
FIG. 11 is a schematic diagram of a Muller C-element with the wires used for event signals explicitly shown as being dual-rail, complementary wires.
Figure 12:
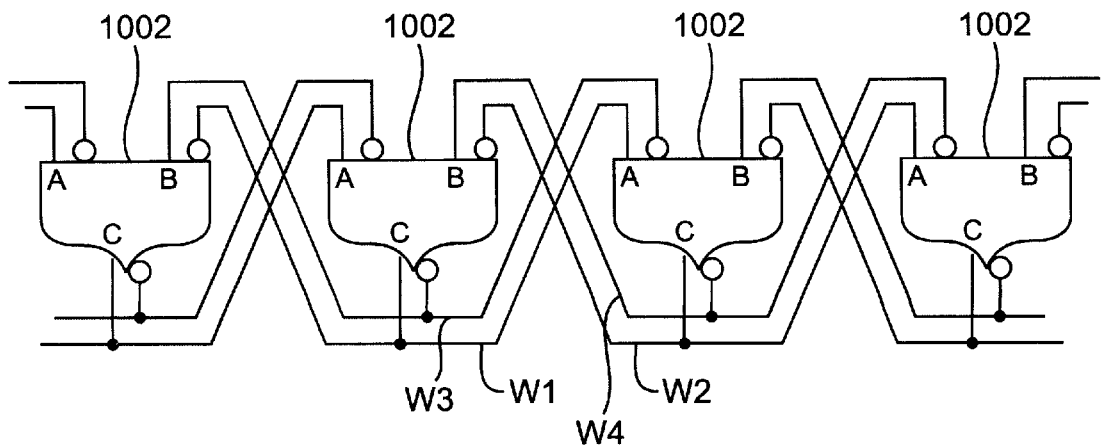
FIG. 12 is a schematic diagram of a portion of the micropipeline of FIG. 10 using Muller C-elements with dual-rail, complementary wire inputs and outputs with the wires explicitly shown.

FIG. 10 illustrates a micropipeline control circuit 1000 that uses a string of MCEs. In this example, the string comprises a series of MCEs 1002, such as those shown in earlier figures. In FIG. 10, only one line appears for each signal. FIG. 11 shows one MCE 1002 with the two rails of the forked Muller C-element. FIG. 12 shows a portion of the micropipeline control circuit 1000 of FIG. 10 with both rails shown. The signals labeled with a complement sign (¬) in earlier figures appear in FIGS. 10–12 with bubbles. Because the inputs of the Muller C-element are active-HI, the encoding is HI=hot. Thus, rising transitions from one Muller C-element make adjacent Muller C-elements act.

Consider the flow of rising signals around one figure-eight loop in FIG. 12. It is the rising signal that matters in each case. Because of the interchange of wires in the reverse or acknowledge direction, the rising edge circulates through the two sides of each Muller C-element alternately, through wire W1, then wires W2, W3 and W4, in order.

A rising output from the Muller C-element initiates action in its adjacent circuits. In the forward direction of the micropipeline, a rise on the "true" side of one Muller C-element permits a rise on the "true" side of the subsequent one. In the reverse direction of the micropipeline, a rise on the "true" side of a subsequent Muller C-element permits a rise on the "complement" side of its predecessor. Because the falling signals merely render the Muller C-elements idle, when they occur is not of essential interest, provided it is soon enough to avoid excess power consumption.

A "cold to hot" transition at some input of a Muller C-element causes a matching "cold to hot" transition at its output. To have these active transitions match in direction, an even number of inversions should occur within the Muller C-element between the input and output transitions.

The behavior of the micropipeline will be described briefly. Each stage (of the micropipeline; not to be confused with stages within an MCE) acts only when its predecessor and successor differ in state, and when it acts, the stage acts to copy its predecessor. Thus, if all stages are initially FALSE, no action happens. As soon as a TRUE input is presented from the source (at the left of the chain), however, the first Muller C-element must act, because both its inputs are now TRUE. Its left input is TRUE because of the newly arrived TRUE signal and its right input is true by virtue of the output of its successor being FALSE and the bubble. As soon as the first Muller C-element becomes TRUE, so must the second, and so on down the chain. Thus, a signal presented at the left propagates along the chain, filling the FIFO. If the FIFO is full, as characterized by its stages being alternately TRUE and FALSE, propagation from left to right stops, but propagation of "bubbles" or "space" is possible from right to left.

Ebergen et al. [Ebergen, J., et al., "Predicting Performance of Micropipelines Using Charlie Diagrams," Proceedings of the Fourth International Symposium on Advanced Research in Asynchronous Circuits and Systems (ASYNC98), March–April 1998] describe three operating regimes for such micropipeline controls: source-limited, sink-limited, and self-limited. In the source-limited case, new data elements appear at the left or input end of the micropipeline less rapidly than subsequent Muller C-elements could accept them. In this case, each Muller C-element waits for its predecessor to deliver the next data element, passes the element on to its successor, and returns to waiting for its predecessor.

In the sink-limited case, data elements leave the right end of the micropipeline less rapidly than the predecessor Muller C-elements could deliver them. In this case, each predecessor Muller C-element waits for its successor to accept the next data element. The Muller C-element then immediately accepts a new data element from its predecessor and returns to waiting for its successor.

In the self-limited case, data elements arrive and depart from the two ends of the FIFO as quickly as the Muller C-elements can transport them. In this case, the Muller C-elements operate as fast as they can. As each Muller C-element fires, it enables both its predecessor and successor to fire, which they do, thus immediately enabling this Muller C-element to fire again. Only in the self-limited case does each Muller C-element get both its inputs simultaneously, or nearly simultaneously.

The self-limited case is very rare in practice. Usually in a micropipeline, there are one or more stages that are slower than the others are. These bottlenecks always limit the performance of the whole micropipeline. Stages prior to such a bottleneck are sink-limited and stages following it are source-limited. The rare nature of the self-limited case is a major advantage in the one-hot Muller C-elements described here. In the source-limited or sink-limited cases, there is an interval between actions during which the inputs to the Muller C-element differ. As explained elsewhere herein, during such an interval, the designs presented here turn off all of their driver transistors, readying themselves for their next action.

Consequently, crossover current in the output driver transistors is a problem only in the rare self-limited case. Thus, strict adherence to the transition order of the one-hot protocol is less important than might otherwise be the case. Normally, crossover current is not present as long as the reset transition at one input precedes the active transition at the other input. Suppose there is a small protocol error that causes a reset transition to follow the active transition on the same dual-rail pair by a time Q. This small error will not matter if the waiting time imposed by source-limiting or sink-limiting exceeds Q, because the waiting time imposed by source-limiting or sink-limiting lets such a reset transition arrive before the active transition on the other input of the Muller C-element, and that is enough to avoid crossover current.

In practice, transistor sizes for these circuits can be chosen that make the reset transition occur as soon as possible, but if it lags the active transition by a fraction of a gate delay, little harm is done.

A Generalized View

Figure 13:
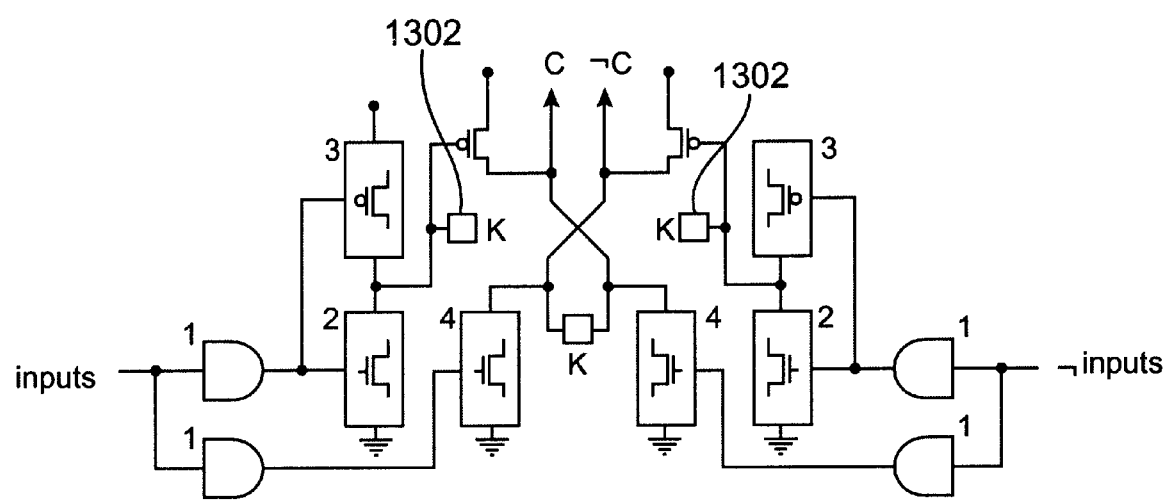
FIG. 13 is a generalized schematic diagram for representing variations of a forked Muller C-element.

FIG. 13 is a generalized schematic diagram of a forked MCE. As shown there, each fork in contains several logic blocks, shown abstractly as blocks numbered 1 to 4. Blocks 2–4 are shown each with a transistor symbol inside to indicate the type of transistors from which it is made. Blocks 2 and 4 might be very similar. Block 4 comprises the N-type transistors that form the pulldown output driver, while block 2 comprises the pulldown logic of the amplifier. For example, block 2 on the left half of FIG. 13 might correspond to transistors 306, 308 in circuit 600 shown in FIG. 6.

Logic blocks 2 and 4 are not identical however. One difference might be in the width of their N-type transistors. Generally, the transistors in the N-type output driver (block 4) are wider than those in the amplifier (block 2). Another possible difference is that the amplifier normally requires its own pullup network (block 3) whereas the output driver (block 4) does not. The pullup network for the output driver is provided by the P-type driver transistor from the other fork.

The logical topology of the N-type network in the two logic blocks 2 and 4 is preferably identical, as the two logic blocks are expected to both implement the same logic function.

Recall that under certain input conditions only the keeper retains the output value of the Muller C-element because neither fork acts. Under these conditions, the N-type output driver network (block 4) does not conduct, nor does the N-type transistor network in the amplifier (block 2). But, if the amplifier is a static amplifier as, for example, is the NAND gate of earlier figures, its P-type transistor network (block 3) always conducts when its N-type network (block 2) does not.

Reducing the number of P-type transistors in the amplifier pullup network (block 3) can speed operation. In some circuits, it is possible to use a dynamic amplifier to drive the P-type output driver. For example, if a particular input to the logic network is known to always changes before the others, it can be used alone to reset the amplifier logic network. In such cases, additional keepers might be needed. The two additional keepers 1302 shown in FIG. 13 serve to retain the value of the outputs of the amplifier networks (blocks 2, 3) when the output is driven neither HI nor LO. These are two entirely separate keepers, because the outputs of the two amplifiers may differ or may both be HI, depending on the sequence of inputs.

Thus, FIG. 13 shows a very general MCE circuit suitable for many applications. It has one or more stages of preliminary logic (block 1) followed by an amplifier (blocks 2, 3) and driver network (block 4). The networks of blocks 2 and 4 have similar topology. Three keepers operate to hold critical values during certain conditions of inputs.

The high speed of the elements described here makes possible a host of high speed asynchronous FIFO buffers and pipeline controls that will exhibit low latency as well as high throughput. The high speed of these circuits leaves plenty of room to retard their operation flexibly to accommodate data processing when required.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A one-hot Muller C-element, wherein an event received on each of a first input and a second input results in an event being output, the Muller C-element comprising:

a true transistor pair comprising one transistor having a gate coupled to a first true input and another transistor having a gate coupled to a second true input;

a true arm comprising the true transistor pair, coupled in series between a complement output and ground, and a true pull-up transistor, coupled between the complement output and a source;

a true arm pull-up logic gate, coupled at its inputs to complement input wires of the one-hot Muller C-element and coupled at its output to a gate of the true pull-up transistor;

a complement transistor pair comprising one transistor having a gate coupled to a first complement input and another transistor having a gate coupled to a second complement input;

a complement arm comprising the complement transistor pair, coupled in series between a true output and ground, and a complement pull-up transistor, coupled between the true output and the source; and a complement arm pull-up logic gate, coupled at its inputs to true input wires of the one-hot Muller C-element and coupled at its output to a gate of the complement pull-up transistor.

2. The one-hot Muller C-element of claim 1, further comprising additional logic gates arranged such that a rising gate delay between the inputs to the one-hot Muller C-element and a rising output is less than a falling gate delay between the inputs to the one-hot Muller C-element and a falling output.

3. The one-hot Muller C-element of claim 2, wherein the additional logic gates comprise amplifiers.

4. A Muller C-element operating according to a one-hot protocol, wherein the one-hot protocol is such that an event is signalled on a complementary wire pair by a transition in one direction on one of the wires of the complementary wire pair, the Muller C-element comprising:

a true fork circuit coupled to true inputs of the Muller C-element;

a complement fork circuit coupled to complement inputs of the Muller C-element;

a reset arm of the true fork that acts when an inactive edge of a signal is received at the true inputs of the Muller C-element;

an active arm of the true fork that acts when an active edge of the signal is received at the true inputs of the Muller C-element, wherein more input current flows to the active arm in a transition relative to the input current flowing to the reset arm in a reset transition.

5. The Muller C-element of claim 4, wherein the one-hot protocol is such that the event is signalled by a rising transition on a true wire of the complementary wire pair.

6. The Muller C-element of claim 4, wherein the one-hot protocol is such that the event is signalled by a falling transition on a true wire of the complementary wire pair.

7. The Muller C-element of claim 4, further comprising:

a reset arm of the complement fork that acts when an inactive edge of the signal is received at the complement inputs of the Muller C-element;

an active arm of the complement fork that acts when an active edge of the signal is received at the complement inputs of the Muller C-element, wherein more input current flows to the active arm of the complement fork in a transition relative to the input current flowing to the reset arm of the complement fork in a reset transition.

* * * * *